March 26, 1929.  M. T. MILES ET AL  1,706,934
PIE CUTTER
Original Filed Aug. 31, 1926
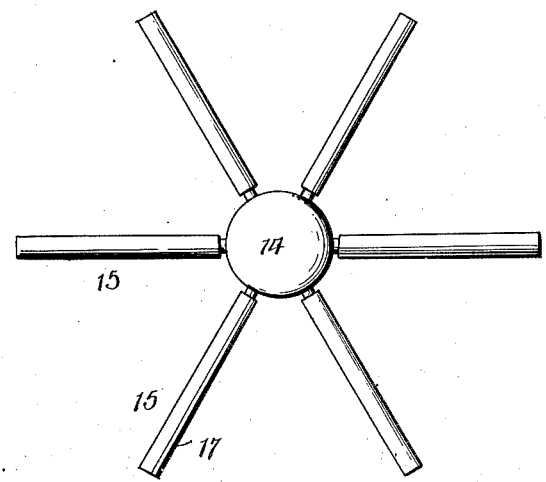
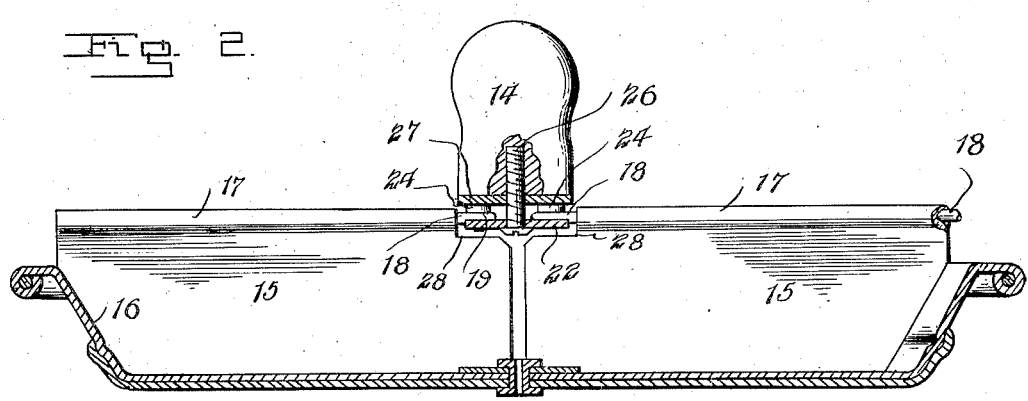
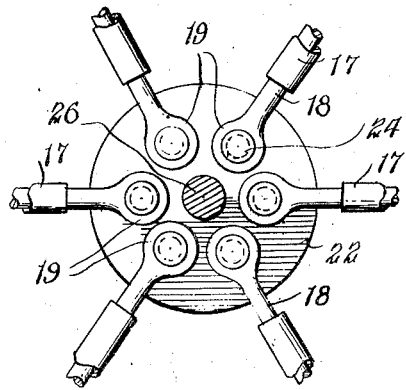
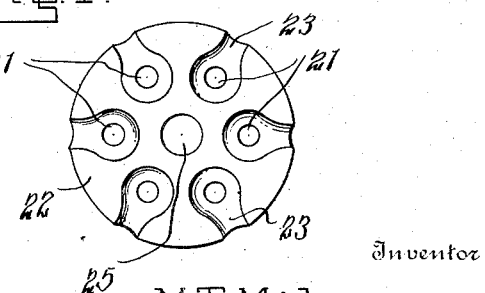
Inventor
M. T. Miles
G. B. Miles
By Lacey & Lacey, Attorneys Patented Mar. 26, 1929.

1,706,934

UNITED STATES PATENT OFFICE.

MILO T. MILES AND GRACE B. MILES, OF OAKLAND, NEAR SAN LEANDRO, CALIFORNIA.

PIE CUTTER.

Original application filed August 31, 1926, Serial No. 132,790. Divided and this application filed October 7, 1927. Serial No. 224,693.

This invention is a cutter for dividing a pie while it is in the baking pan, the present application being a division of an application filed by us August 31, 1926, Serial No. 132,790. The object of the invention is to provide a cutter of novel construction which may be easily manipulated to divide an entire pie into equal sections.

In the drawing:

Figure 1 is a plan view of the cutter.

Figure 2 is a sectional elevation showing the cutter within a pan.

Figure 3 is a sectional plan view of the hub portion of the cutter.

Figure 4 is a detail plan view of the lower washer forming a part of the cutter.

Our apparatus provides a cutter by the use of which a pie may be cut into slices of equal size before being removed from the pan, and this cutter comprises a central handle 14 and radial knives or blades 15. The knives are provided in such number and in such angular relation that they may be placed over the pie and then by being pushed downwardly through the pie will divide the same into slices. The several blades 15 have vertical inner end edges which may be brought close together at the center of the pan and their outer edges are inclined, as shown at 16, so that they may fit directly against the rim of the pan. The lower edge of the blade is, of course, the cutting edge and the upper edge portion is rolled to form a tubular bead 17 which receives a light rod 18 supported by the handle member and extending radially therefrom. The inner end of each rod 18 is formed into an eye 19 which is adapted to fit around a pin or stud engaged through an opening 21 provided therefor in a lower washer or clamping plate 22. In the upper surface of this lower clamping plate we provide recesses 23 which have circular portions formed about the opening 21 and radial portions leading outwardly from said circular portions through the edge of the plate, as clearly shown in Figure 4. The eyes 19 will fit within the circular portions of these recesses and the adjacent portions of the rods will fit within the radial portions of the same so that lateral movement of the rods relative to the washer or clamping plate will be prevented. The pins or studs are constructed with heads 24 of greater diameter than the pins so that, when the parts are assembled, the heads will extend over and rest upon the eyes 19. The clamping plate or washer is provided with a central opening 25 through which a retaining screw or threaded pin 26 is inserted upwardly, an upper washer or clamping plate 27 being fitted about the screw to extend over and rest upon the pin heads 24, as clearly shown in Figure 2. Bearing upon the washer or clamping plate 27 and engaged with the screw 26 is the handle 14 which is suitably shaped to fit comfortably within and be easily grasped by the hand of the user, the rotating engagement of the said handle with the screw causing the handle to ride downwardly on the screw and cause the upper clamping plate 27 to bear upon the pins or studs so that the rods 18 of the cutter will be firmly secured by and between the two clamping plates, and it is to be noted that the inner upper corners of the several blades 15 are provided with notches or recesses 28 whereby to accommodate the several securing elements.

It is general practice to divide a pie into six pieces and ordinarily, therefore, the cutter will have six blades but, of course, the number of blades is immaterial. If it be desired to divide a pie into three equal parts, this may be done by merely removing the alternate cutting blades and if it be desired to divide the pie into halves, all the knives except any two which are in alinement may be removed. The removal of the cutting blades does not necessitate disassembling of the handle and clamping elements inasmuch as the blades to be removed may be merely slipped endwise from the supporting rods 18 on which they are mounted, the tubular beads 17 permitting such removal, although fitting upon the rods sufficiently close to prevent accidental dislodgment during handling of the cutter.

Having thus described the invention, what we claim is:

1. A device for the purpose set forth comprising a pair of clamping plates, supporting rods secured by and between said plates and extending radially therefrom, and cutting blades provided with tubular beads along their upper edges engaged over the said rods.

2. A device for the purpose set forth comprising a lower clamping plate provided with radial grooves in its upper surface, supporting arms fitting in said grooves and extending outwardly from the plate, headed studs fitted through the inner ends of the said arms and the clamping plate, an upper clamping plate resting upon the said studs, means for binding the plates together, and cutting blades carried by and depending from the radial arms.

In testimony whereof we affix our signatures.

MILO T. MILES. [L. S.]
GRACE B. MILES. [L. S.]